UNITED STATES PATENT OFFICE.

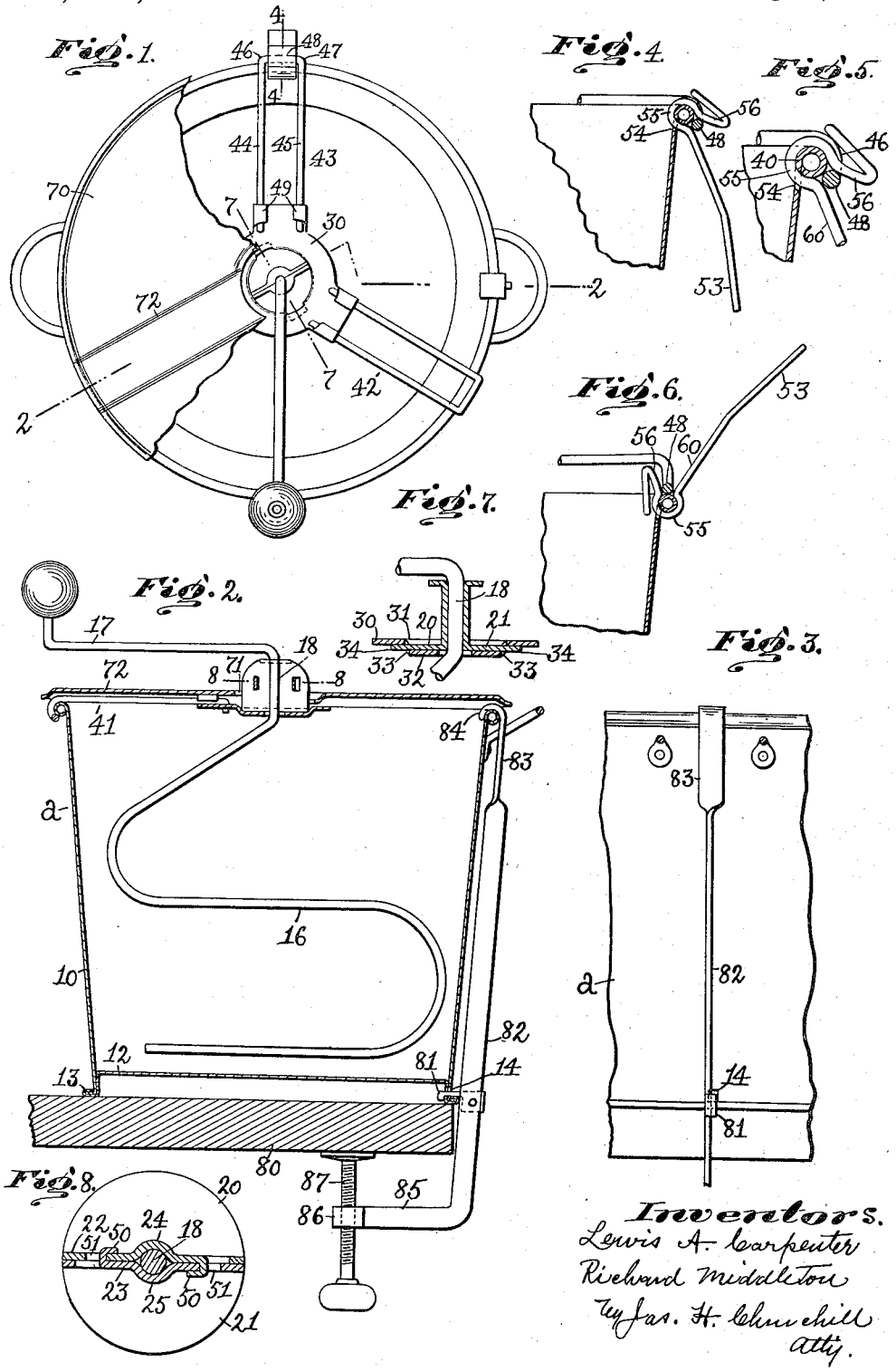

LEWIS A. CARPENTER AND RICHARD MIDDLETON, OF REVERE, MASSACHUSETTS.

BREAD-MIXER.

1,196,932.

Specification of Letters Patent.

Patented Sept. 5, 1916.

Application filed December 7, 1915. Serial No. 65,617.

*To all whom it may concern:*

Be it known that we, LEWIS A. CARPENTER and RICHARD MIDDLETON, citizens of the United States, and residents of Revere, in the county of Suffolk and State of Massachusetts, have invented an Improvement in Bread-Mixers, of which the following description, in connection with the accompanying drawings, is a specification, like characters on the drawings representing like parts.

This invention relates to a beating or mixing apparatus and is herein shown as embodied in an apparatus especially designed and adapted for mixing bread.

The invention has for its object to provide an efficient, simple, durable and inexpensive apparatus for the purpose specified.

The particular features of this invention will be pointed out in the claims at the end of this specification.

Figure 1 is a plan of an apparatus embodying this invention with the cover broken away. Fig. 2, a vertical section on the line 2—2, Fig. 1. Fig. 3, a detail in elevation to be referred to. Figs. 4, 5, and 6, enlarged details in section on the line 4—4, Fig. 1. Fig. 7, a section on the line 7—7, Fig. 1, and Fig. 8, an enlarged section on the line 8—8, Fig. 2.

Referring to the drawing *a* represents a vessel for containing the material to be stirred or agitated, which material will be referred to as dough. The vessel *a* is preferably made of sheet metal and is open at its upper end and is provided with a body portion 10 having a raised bottom 12 and an outwardly extended flange 13, said body portion, bottom and flange being preferably of one piece of metal. The body portion 10 is provided below the bottom 12 with a slot or opening 14 for a purpose as will be described.

The vessel *a* is designed to receive a rotatable mixing device or beater, preferably made as herein shown and consisting of a metal rod having a bent lower portion 16, a substantially horizontal upper portion 17 forming a handle, and a straight intermediate portion 18, which latter forms a rotatable shaft and is supported in a bearing member, which is secured to a supporting member, as will be described. The bearing member referred to is preferably made as herein shown and consists of two substantially semi-circular plates 20, 21, (see Fig. 8) provided with vertical walls 22, 23, having concaved portions 24, 25, which coöperate to form a hub in which the shaft 18 is rotated. The vertical walls 22, 23, are provided with means for fastening them together after the walls have been assembled as will be described.

The supporting member herein shown consists of a sheet metal disk 30 having a circular depression or recess 31, upon whose bottom wall 32 the plates 20, 21, rest, and whose annular wall is provided with substantially diametrically opposite slots 33 (see Fig. 7) for the reception of lugs or ears 34 on the said plates, said ears acting to lock the bearing member to the supporting member or frame. The disk 30 is supported by the circumferential wall or rim 40 of the vessel *a*, which may be accomplished as herein shown by radial arms, herein shown as three in number, and marked 41, 42, 43, each of which is made of a wire rod. The wire rod from which each radial arm is formed is suitably bent to form parallel rods 44, 45, which are bent downwardly at their outer ends to form hooks 46, 47, which are joined by a cross bar 48, the latter being designed to engage the outer surface of the rim 40 below the horizontal center thereof. The inner ends of the rods 44, 45, are preferably extended down through holes in the disk 30 and are fastened to the latter by ears or lugs 49, which are folded over upon said rods.

The bearing member for the shaft 18 is designed to be permanently secured to the disk 30, so that the beater 16 is permanently secured to the supporting member, and this may be accomplished as herein shown by providing each upright wall 22, 23, with a finger 50, which is extended through a slot 51 in the opposing upright wall and bent or clenched against the latter, as represented in Fig. 8. Provision is made for quickly and easily securing the supporting frame in fixed relation to the vessel *a*, and to this end one of the radial arms of said supporting member has coöperating with it a device for causing the hooked end of the radial arm, which normally does not project beyond the rim 40 of the vessel to be engaged with the outside of said rim below the horizontal center of the latter, so as to firmly lock the supporting member to the vessel. In the present instance, we have shown one construction of device for this purpose, which consists of a lever 53 having one arm inserted through a slot 54 in the body portion 10 of the vessel $a$ in closer proximity to the rim 40. The lever 53 is provided with a curved portion 55, which embraces the rim 40, so that the latter forms a pivot upon which the lever can be turned. The lever 53 is provided with arms, which diverge from the ends of the curved portion and form a substantially V-shaped opening for the reception of the cross bar 48 of the hooked end of the radial arm 43. The short arm 56 of the lever 53 may and preferably will be bent back upon itself to strengthen or stiffen the same when the lever is made from sheet metal as is preferred.

The supporting frame or member is made of substantially the same diameter as the rim of the vessel, so that when the hooked ends of two of the radial arms as 41, 42, are engaged with the outer surface of the rim 40, the third radial arm 43 will be within the outer circumference of the rim and will preferably rest upon the upper surface of said rim, as represented in Fig. 6, with the arms 56, 60 of the lever located on opposite sides of the cross bar 48 of the radial arm 43. When the radial arm 43 is in the position shown in Fig. 6, the supporting frame and the beater secured thereto can be easily removed from the vessel. When, however, it is desired to lock the supporting frame or member to the vessel, the long arm of the lever 53 is turned down from the position shown in Fig. 6 to that shown in Figs. 4 and 5. As the long arm of the lever is turned down, the lever pivots on the rim 40, and the short arm 56 engages the cross bar or rod 48 and causes a relative movement of one or both parts, to wit: the rim 40 and cross bar 48.

In the construction herein shown, the cross bar 48 acts as a more or less stationary abutment for the short arm 56 of the lever 53 to bear against, and as the long arm of the lever is turned, the rim 40 is sprung or pressed inwardly a sufficient distance to permit the cross bar 48 to be carried down on the outer surface of the rim 40 and below the horizontal center of the same, whereupon the pressure upon the rim is relieved and the latter springs outwardly into firm engagement with the cross bar 48 and the hooks 46, 47, connected thereby, thus firmly locking the supporting frame or member to the vessel against accidental removal or displacement. The apparatus is now in condition to be used for mixing and beating the materials placed in it, and the vessel may be provided with a suitable cover 70, which has a central opening 71 to permit the cover to be slipped over the handle 17, and is further provided with radial raised portions 72 to fit over the radial arms of the supporting member.

When the dough or other material has been properly mixed, the cover 70 is removed and the lever 53 is turned from substantially the position shown in Fig. 4 to that shown in Fig. 6, which unlocks the supporting frame or member and enables it and the beater to be readily removed from the vessel.

Provision is also made for securing the vessel $a$ in a fixed position on a table, bench or other support 80, and to this end the vessel $a$ is provided in its body portion below the bottom 12 with the slot 14 for the reception of a hooked finger 81 attached to a bar 82, preferably of sheet metal, which is presented edge on to the vessel for the greater portion of its length, and is twisted at its upper end to present its wide portion 83 to the vessel $a$, which wide portion is provided with a hook 84 at its upper end to engage the rim of the vessel. The bar 82 is provided at its lower end with a laterally extended arm 85, which is designed to project under the table 80 and is provided with a screw-threaded eye 86 for the reception of a screw 87, by turning which the vessel is drawn firmly down onto the table. The hooked finger 81 prevents the vessel $a$ from moving away from the edge of the table 80 as the pressure of the holding bar 82 is applied to the rim of the vessel, which it would be liable to do if the finger 81 and the slot 14 in the vessel $a$ were omitted, on account of the side of the vessel being inclined. The clamping or holding device 82 can be quickly and easily applied to the vessel, and the latter secured in fixed relation to the table in a minimum time.

In assembling the apparatus for use, the vessel is clamped to the table as described, and the flour placed therein. The supporting frame with the beater attached thereto is then applied to the vessel with two of the radial arms hooked under the rim and the third resting on the rim between the arms of the lever 53 as represented in Fig. 6. The lever is then turned down to engage the hooked end of the third radial arm with the outside of the rim, as represented in Figs. 4 and 5. The cover may then be applied and the apparatus is ready for mixing or treating the materials in the vessel by turning the handle in either direction.

We have herein shown one construction of apparatus embodying the invention, but it is not desired to limit the invention to the particular construction shown.

Claims:

1. In an apparatus of the character described, in combination, a vessel open at its top, a supporting frame having a disk provided with a recess and with slots in the circumferential wall of said recess, arms attached to said disk and provided with hooks to engage the rim of said vessel, plates located in said recess and provided with lugs extended into the slots in the circumferential wall of said recess and having upright walls secured together and provided with concaved portions which coöperate to form a bearing hub, a shaft extended through said hub and provided with a portion extended into said vessel, and means for locking said supporting frame to said vessel.

2. In an apparatus of the character described, in combination, a vessel open at its top, a beater-supporting frame detachably secured to the rim of said vessel, and a lever extended through the body portion of said vessel and pivotally engaged with the rim of the vessel to turn thereon, said lever coöperating with said supporting frame to cause relative movement of said rim and frame to effect locking engagement of said frame with the outer surface of said rim.

3. In an apparatus of the character described, in combination, a vessel open at its top, a beater-supporting frame provided with arms having hooks for engaging the rim of the vessel, said frame being of a diameter to normally prevent the hooks of all of said arms to be engaged with the outer surface of said rim, when one or more of said hooks are engaged therewith, and means for moving said rim inwardly to permit the normally disengaged hook to be engaged with the outer surface of said rim below the center of the latter to lock said supporting frame to the rim of said vessel, and a beater carried by said frame and extended into said vessel.

4. In an apparatus of the character described, in combination, a vessel open at its top, a supporting frame having hooks for engagement with the outer surface of the rim of said vessel, and means carried by said vessel for springing the said rim inwardly to enable the said hooks to be engaged with the outer surface of said rim to lock the supporting frame thereto.

5. In a machine of the character described, in combination, a vessel open at its top, a supporting frame provided with hooks for engagement with the rim of the vessel and with a depression having slots in its wall, a bearing member comprising plates located in said depression and having lugs extended into said slots and having upright walls provided with concaved portions forming a hub, means to secure said walls together, and a rotatable shaft extended through said hub and having a portion extended into said vessel.

6. In an apparatus of the character described, in combination, a vessel open at its top and provided with a slot in its body portion near the bottom thereof, a bar having its upper portion twisted substantially at right angles to its lower portion to present the lower portion edge-on to the vessel and to present a substantially wide upper portion to said vessel, said upper portion having a hook at its upper end to engage the rim of said vessel and said lower portion having at its lower end a laterally extended arm capable of being extended under a support for said vessel, a hooked finger attached to the lower portion of said bar and arranged thereon to extend through the slot in said vessel, and a screw carried by said laterally extended arm to engage the under side of the support for said vessel.

7. In an apparatus of the character described, in combination, a vessel open at its top, a supporting frame extended across the open top of said vessel and having a plurality of devices for engagement with the outer surface of the rim of said vessel, said frame being constructed and arranged to prevent engagement of all of said devices with the outer surface of the rim of the vessel without inward movement of said rim, and means for moving said rim inwardly to permit all of the said devices to be engaged with the outer surface of the rim below the center of the latter.

8. In an apparatus of the character described, in combination, a vessel open at its top and having a rim capable of being sprung inwardly, a supporting frame extended across the open top of said vessel and provided with devices for engaging the outer surface of said rim, and means for springing the said rim inwardly to enable the said devices to be engaged with the outer surface of said rim below the center of the latter to lock the supporting frame to said vessel.

9. In an apparatus of the character described, in combination, a vessel open at its top and having a rim capable of being sprung inwardly, a supporting frame extended across the open top of said vessel and provided with devices for engaging the outer surface of said rim, and means carried by said vessel and coöperating with said frame to spring said rim inwardly and enable said devices to engage the outer surface of said rim and lock the said frame to said vessel.

10. In an apparatus of the character described, in combination, a vessel open at its top, a beater-supporting frame provided with arms spaced apart and having hooks at their outer ends for engaging the rim of the vessel, said hooks being connected by a cross bar which also engages the rim of the vessel below the center of said rim in the locked position of said frame, and a lever pivotally connected with the said vessel and coöperating with said cross bar to effect locking engagement of said cross bar with the rim of said vessel.

11. In an apparatus of the character described, in combination, a vessel open at its top, a beater-supporting frame provided with arms having hooks for engaging the rim of the vessel and connected by a cross bar which also engages the rim of the vessel below the center of said rim in the locked position of said frame, and means coöperating with said cross bar to press the same downwardly and effect locking engagement of said cross bar with the rim of said vessel below the center of said rim.

In testimony whereof, we have signed our names to this specification.

LEWIS A. CARPENTER.
RICHARD MIDDLETON.

Copies of this patent may be obtained for five cents each, by addressing the "Commissioner of Patents, Washington, D. C."